US012509361B2

(12) United States Patent
Verdickt et al.

(10) Patent No.: US 12,509,361 B2
(45) Date of Patent: Dec. 30, 2025

(54) PROCESS FOR PREPARING A HIGH-PURITY NICKEL SULPHATE SOLUTION

(71) Applicant: Umicore, Brussels (BE)

(72) Inventors: Werner Verdickt, Olen (BE); Joris Roosen, Olen (BE); Wannes De Moor, Olen (BE); Jan Luyten, Olen (BE)

(73) Assignee: UMICORE, Brussels (BE)

( * ) Notice: Subject to any disclaimer, the term of this patent is extended or adjusted under 35 U.S.C. 154(b) by 0 days.

(21) Appl. No.: 19/105,072

(22) PCT Filed: Aug. 23, 2023

(86) PCT No.: PCT/EP2023/073107
§ 371 (c)(1),
(2) Date: Feb. 20, 2025

(87) PCT Pub. No.: WO2024/042115
PCT Pub. Date: Feb. 29, 2024

(65) Prior Publication Data
US 2025/0263306 A1    Aug. 21, 2025

(30) Foreign Application Priority Data

Aug. 24, 2022   (EP) .................................... 22191867

(51) Int. Cl.
| | | |
|---|---|---|
| *C01G 53/10* | (2006.01) | |
| *C01G 53/01* | (2025.01) | |
| *C22B 3/00* | (2006.01) | |
| *C22B 3/08* | (2006.01) | |
| *C22B 3/38* | (2006.01) | |
| *C22B 26/22* | (2006.01) | |
| *C22B 47/00* | (2006.01) | |

(52) U.S. Cl.
CPC ............. *C01G 53/10* (2013.01); *C01G 53/01* (2025.01); *C22B 3/08* (2013.01); *C22B 3/3842* (2021.05); *C22B 3/3846* (2021.05); *C22B 23/043* (2013.01); *C22B 23/0453* (2013.01); *C22B 23/0484* (2013.01); *C22B 26/22* (2013.01); *C22B 47/00* (2013.01); *C01P 2006/40* (2013.01); *C01P 2006/80* (2013.01)

(58) Field of Classification Search
CPC ...... C01G 53/10; C01G 53/01; C22B 3/3842; C22B 3/3846; C22B 3/08; C22B 23/043; C22B 23/0453; C22B 23/0484; C22B 26/22; C22B 47/00
See application file for complete search history.

(56) References Cited

U.S. PATENT DOCUMENTS

| | | | |
|---|---|---|---|
| 6,149,885 A | 11/2000 | Makino et al. | |
| 9,017,640 B2 | 4/2015 | Nakai et al. | |
| 2004/0050212 A1 | 3/2004 | Cheng et al. | |
| 2014/0322109 A1 | 10/2014 | Nakai et al. | |
| 2022/0017989 A1* | 1/2022 | Beer ................... | H01M 10/54 |

FOREIGN PATENT DOCUMENTS

| | | |
|---|---|---|
| CN | 106745342 B | 3/2019 |
| CN | 109852794 A | 6/2019 |
| CN | 110467229 A | 11/2019 |
| CN | 111334664 A | 6/2020 |
| CN | 113060778 A | 7/2021 |
| CN | 114853093 A | 8/2022 |
| EP | 1252345 B1 | 6/2008 |
| EP | 2784166 A1 | 10/2014 |
| EP | 3222735 A1 | 9/2017 |
| EP | 3733884 A1 | 11/2020 |
| JP | H10310437 A | 11/1998 |
| JP | 2013100204 A | 5/2013 |
| JP | 2021031729 A | 3/2021 |
| JP | 2021031730 A | 3/2021 |
| KR | 20130089505 A | 8/2013 |
| KR | 20200078199 A | 7/2020 |
| WO | 0222897 A1 | 3/2002 |
| WO | 2013077296 A1 | 5/2013 |

(Continued)

OTHER PUBLICATIONS

ISA/EPO: International Search Report and Written Opinion of International Application No. PCT/EP2023/073107, mailed Nov. 14, 2023.

(Continued)

*Primary Examiner* — James A Fiorito
(74) *Attorney, Agent, or Firm* — Rimon P.C.; Allyn B. Elliott

(57) ABSTRACT

The present invention provides a process for preparing a high-purity nickel sulphate solution, comprising the steps of: i. forming an aqueous mixed metal sulphate solution by reacting sulphuric acid with a raw material feed comprising nickel, manganese, cobalt, and magnesium in an aqueous medium; ii. extracting manganese from said aqueous mixed metal sulphate solution, thereby obtaining a first aqueous raffinate comprising nickel, cobalt and magnesium, and a manganese-rich organic phase; iii. extracting cobalt from said first aqueous raffinate, thereby obtaining a second aqueous raffinate comprising nickel and magnesium, and a cobalt-rich organic phase; and iv. extracting magnesium from said second aqueous raffinate solution, thereby obtaining a high-purity nickel sulphate solution, and a magnesium-rich organic phase.

17 Claims, No Drawings

(56) References Cited

FOREIGN PATENT DOCUMENTS

WO      2019090389 A1    5/2019
WO      2020220559 A1    11/2020

OTHER PUBLICATIONS

JPO: English Translation of Office Action issued corresponding Japanese Patent Application No. 2025-511639, mailed Sep. 24, 2025, 3 pages.
Institute of Mexican Intellectual Property: Office Action issued in corresponding Mexican Patent Application No. MX/a/2025/002134, mailed Aug. 20, 2025, with English Translation, 8 pages.

* cited by examiner

PROCESS FOR PREPARING A HIGH-PURITY NICKEL SULPHATE SOLUTION

CROSS REFERENCE TO RELATED APPLICATIONS

This application is a U.S. National Stage Application of International Patent Application No. PCT/EP2023/073107, filed on Aug. 23, 2023, which claims priority to European Patent Application No. 22191867.5, filed on Aug. 24, 2022.

TECHNICAL FIELD

The present invention relates to a novel method for producing an aqueous high-purity nickel sulphate solution having a purity sufficient for use in the electroless deposition of nickel metal layers or the production of battery materials.

INTRODUCTION

The development of lithium-ion batteries, and specifically the use of nickel-manganese-cobalt and nickel-cobalt-aluminium cathode materials, has increased the demand for high-purity nickel sulphate, either as a solid or in solution. Indeed, impurities in the cathode materials strongly affect the performance of the batteries. As such, much effort has been devoted to producing high-purity nickel sulphate in an industrially viable process.

In this respect, US 2014 322109 provides a method for obtaining high-purity nickel sulphate having low levels of impurities, particularly low levels of magnesium and chloride, by introduction of a selective nickel sulphide precipitation step and redissolution of nickel sulphide to a nickel sulphate solution. This solution is further refined by solvent extraction to remove cobalt and magnesium impurities, adjusting the concentration of an acidic organic extractant and the pH or acid concentration at the time of treatment. The described processing strategy is cumbersome for concentrated nickel sulphate solutions since it requires an intermediate precipitation and redissolution of the nickel bulk, followed by solvent extraction to remove impurities cobalt and magnesium. Especially the nickel sulphide step is dangerous due to risk of hydrogen sulphide generation. Moreover, the solvent extraction is used only to remove cobalt and magnesium, although crude nickel raw materials typically contain many more impurities.

CN 107 162 067 relates to the field of recycling of solid waste and particularly discloses a method for recycling high-purity nickel sulphate from nickel-bearing waste batteries. The method comprises the steps of disassembling the nickel-bearing waste batteries into battery powder, dissolving the battery powder with an acid to obtain a metal-bearing solution, adding alkali metal sulphate, removing iron by an oxidative precipitation process, further removing impurities via a solvent extraction process to obtain magnesium-bearing nickel liquid, passing the magnesium-bearing nickel liquid through chelating-resin exchange columns to selectively adsorb nickel ions and leave a magnesium-rich solution flowing out for treatment, desorbing the nickel ions to obtain a nickel sulphate solution, evaporating the nickel sulphate solution, cooling, crystallizing, filtering, and finally drying to obtain the purified nickel sulphate product. By this lengthy and complex process, it is guaranteed that the recycled nickel sulphate is a high-purity product having a content up to 99.5% nickel and above, while the impurity, i.e. magnesium, content is less than 0.005%. However, three different solvent extraction units are proposed to remove copper, manganese and cobalt in separate steps. Apart from high investment costs, other impurities such as calcium and magnesium are not even pretended to be removed. Finally, nickel is recovered by adsorption onto a resin, requiring a fourth separation step and consumption of neutralization agent equivalent to the amount of adsorbed metal ions. Overall, the described process is considered not simple neither efficient.

EP 1 252 345 B1 describes a process for extraction of cobalt from a cobalt-nickel solution with solvent loaded with nickel in order to obtain a purified nickel sulphate stream. It does however not learn how to remove impurities such as calcium and magnesium to very low levels in order to produce a purified nickel sulphate solution for electroless nickel or battery applications. It looks more to develop a solvent extraction process where the formation of insoluble ammonium/nickel sulphate double salts can be avoided.

EP 2 784 166 explains a process for producing a pure nickel sulphate solution in multiple process steps including a sulphurisation step, a redissolution step, a purification step by precipitation and a solvent extraction step. Especially the steps of sulphurisation and redissolution are expensive operations using a sulphurising agent and producing a sulphide intermediate of nickel, both products are toxic and could lead to generation of the highly toxic and gaseous hydrogen sulphide by contact and reaction with mineral acids. At the end, the purified nickel sulphate solution still contains 50 mg/L magnesium impurity which is too much for battery-grade nickel sulphate, and showing the lack of selectivity of the proposed process.

EP 3 733 884 describes a solvent extraction method that allows selective separation of magnesium from an acidic aqueous solution of sulphuric acid. The solvent extraction method includes bringing an acidic aqueous solution of sulphuric acid containing nickel, cobalt and magnesium in contact with an organic solvent to selectively extract magnesium to the organic solvent under very specific extraction conditions: either extract magnesium at rather low pH=1.5 to 2 with a concentrated solvent, i.e. containing 40 to 60% of an alkylphosphonic acid as extractant, or at higher pH=2.0 to 2.5 with a solvent containing a lower extractant concentration, i.e. 20 to 50% of an alkylphosphonic acid. This process only aims at removing magnesium and does not separate cobalt from the nickel solution. Remarkably, at most 46% of magnesium was removed from the nickel sulphate solution with already about 9% of nickel co-extracted under the same extraction conditions. Under such conditions a Mg/Ni separation factor of only 8 to 23 is obtained. When the extractant concentration in the used solvent is decreased below 40 vol. % a higher Mg/Ni separation factor up to 35 was obtained but with much lower removal of magnesium, i.e., lower than 28%.

EP 3 222 735 discloses a method of separating cobalt and magnesium from a nickel-bearing feed solution by liquid-liquid extraction, wherein the used organic solvent contains an alkylphosphinic acid as extracting agent. Both cobalt and magnesium are extracted together with some nickel. Nickel is first washed out from the loaded solvent with an acidic solution. Since the resulting nickel solution may contain some cobalt, it is sent back to the feed solution. Hereafter, magnesium is washed off from the solvent with an acidic solution. The obtained magnesium solution may contain some cobalt and is treated elsewhere. Cobalt is stripped from the solvent with a diluted aqueous solution of an acid to form a cobalt strip solution. Apart from cobalt and magnesium, the patent does not cope with the removal of other metal contaminants in a nickel sulphate solution such as calcium, zinc, cadmium, copper, manganese and iron. Neither does it elaborate on how to reach the desired pH for extraction of cobalt and magnesium from the nickel sulphate solution, given the release of acidic protons during extraction with an acidic extractant.

When EHEHPA, also known as PC88A, is used as an extractant, the extraction behaviour towards magnesium or calcium is similar with the behaviour towards nickel. JP 10-310437 discloses an example of separating nickel and cobalt by extracting cobalt together with other impurities such as calcium, copper, zinc, iron and magnesium by solvent extraction using PC88A as an extractant. When a solution containing nickel at a high concentration is submitted to solvent extraction, the problem occurs that the extraction efficiency of magnesium or calcium is decreased. The difficulty to remove magnesium from the nickel sulphate solution is mentioned. The final impurity output concentration in the purified nickel sulphate solution was still 3 to 26 mg/L cobalt, 2 to 7 mg/L calcium and 10 to 27 mg/L magnesium when containing 90 to 117 g/L nickel. The present invention solves the problem of insufficient calcium extraction by choosing operating conditions that favour calcium extraction but decrease magnesium extraction at the same time. This is offset by implementing an additional and separate solvent extraction for magnesium with a more favourable extracting agent and more favourable operating conditions.

In JP 2021031729 A2 the treatment of a crude nickel sulphate solution in one solvent-extraction process is shown where it is tried to remove all cobalt, magnesium and calcium from the nickel sulphate solution at once. The ratio of the amount of nickel loaded onto the solvent versus the concentration of cobalt in the nickel sulphate solution must be varied depending on the desired removal of impurities. However, from the examples it can be seen that it is not possible to remove all contaminants, as the purified nickel sulphate solution still contains 1 to 60 mg/L cobalt, 1 to 20 mg/L magnesium and 1 to 15 mg/L calcium. Also, the removal of magnesium seems marginal as the input concentration of magnesium in the crude nickel sulphate solution is very low, only 19 to 31 mg/L magnesium compared to a very high cobalt concentration of 8 to 12 g/L cobalt. This principle of co-extracting traces of magnesium, even incompletely, together with a large amount of cobalt is evidence that a large amount of nickel onto the solvent is necessarily used. Only it is pretended that magnesium can be better removed when increasing the amount of nickel onto the solvent loaded compared to the concentration of cobalt in the crude nickel sulphate solution. In JP 2021031730 A, a similar patent, it is pretended that the amount of magnesium reported to the cobalt eluate, by co-extraction to the solvent, can be influenced by the chosen amount of nickel onto the solvent compared to the concentration of cobalt present in the crude nickel sulphate solution. Same examples as under JP 2021031729 A2. The purified nickel sulphate solution may still contain impurities as high as 1 to 60 mg/L cobalt, 1 to 20 mg/L magnesium and 1 to 15 mg/L calcium. And the reported amount of co-extracted magnesium to the cobalt eluate can obviously be varied.

In U.S. Pat. No. 6,149,885 A, a process is explained where impurities such as cobalt, calcium, copper and zinc are removed from a crude nickel sulphate solution by solvent extraction. A method is disclosed on how to load nickel onto the solvent that can afterwards be used for the removal of the impurities from the crude nickel sulphate solution. However, magnesium is only sparingly removed. In one example still 34 mg/L magnesium is left in the purified nickel sulphate solution, which is usually considered too impure for battery grade nickel sulphate quality. In another example even 354 ppm magnesium relative to 100% nickel is left in the purified nickel sulphate solution. The removal of other metals such as cadmium and manganese from the crude nickel sulphate solution is even not considered.

CN 111 334 664 describes ternary lithium battery cathode materials comprising nickel, cobalt and manganese, and lithium, recovery of valuable metals, and the use of sulphated oxygen-free roasting-flooding-acid leaching-extraction process. The extraction process has the following steps:

manganese extraction: The P204 concentration of 20%, a saponification degree of 50%, the extraction section, after extraction stage 10 to get loaded organic phase containing Ni, Co, Mn and Mg extraction raffinate.

the extraction of cobalt: Use P507 concentration of 20%, a saponification degree of 60%, extraction segment level 8, to obtain a co-rich organic phase load and enriched in Ni, Mg raffinate.

extraction of magnesium: The P507 concentration of 25%, a saponification degree of 40%, extraction segment 5, get loaded organic phase was rich in Mg and Ni-rich raffinate.

extraction of nickel: Use P507 for stripping nickel, specific conditions: P507 concentration of 20%, a saponification degree of 70%.

CN 113 444 885 describes a method for preferentially extracting metal lithium from waste ternary lithium-ion batteries and simultaneously obtaining battery-grade metal salts, wherein the method for extracting manganese, cobalt, and nickel comprises the following steps:

extract high-purity manganese salt: mix the raffinate collected after leaching the impurities with the organic extractant P204, use the counter-current extraction method for extraction, and collect the raffinate. The organic extractant P204 is mixed with 260 #solvent oil in a proportion of 25%.

extract the cobalt salt: mix the raffinate with organic extractant P507, and extract the raffinate by using a counter-current extraction method; The organic extractant is mixed with 260 #solvent oil with P507 accounting for 25%.

extract the nickel salt: mix the raffinate with the organic extractant Cyanex272 mixed with 260 #solvent oil and use the counter-current extraction method for extraction. In the extraction process, all the magnesium ions in the water phase are extracted into the organic phase to obtain a high-purity nickel sulphate solution. The high-purity nickel sulphate solution is subjected to subsequent processing to obtain battery-grade nickel sulphate.

WO 20/220559 describes a method for recovering valuable metals in waste nickel-cobalt-manganese ternary lithium batteries, including the following steps:

(1) Crushing and carbonizing waste nickel-cobalt-manganese ternary lithium batteries to separate powder and metal particles by air separation;

(2) Leach the powder separated in step (1) with sulfuric acid to obtain a leachate;

(3) Remove $Fe^{2+}$, $Al^{3+}$, $Ca^{2+}$ and $Mg^{2+}$ in the leachate as the pre-extraction liquid;

(4) Use P204 to extract the pre-extraction liquid to remove impurities, and back-extract to obtain a stripping liquid containing manganese sulphate and a raffinate liquid containing $Co^{2+}$, $Ni^{2+}$, and $Li^+$; after removing copper from the stripping liquid, evaporation, concentration, and crystallization to obtain manganese sulphate;

(5) The raffinate obtained in step (4) is used to extract cobalt with P507. When cobalt is extracted with P507, the ratio of oil to water is controlled to be 0.8-0.9:1, lye is used for saponification, and the saponification rate is controlled to be 55%-60%; Cobalt stripping liquid and raffinate containing $Ni^{2+}$ and $Li^+$; the stripping liquid is evaporated, concentrated and crystallized to obtain cobalt sulphate;

(6) The raffinate obtained in step (5) is extracted with C272 to remove impurities to obtain a C272 raffinate after removing $Mg^{2+}$;

(7) Use P507 to extract nickel from the C272 raffinate, and back-extract to obtain a counter-extraction solution containing nickel sulphate and a raffinate solution containing $Li^+$; evaporate and concentrate the counter-extraction solution to obtain nickel sulphate.

A general limitation for processes according to the prior art is that they require a very specific source of nickel containing materials to be fed to the process in order to arrive at a nickel sulphate solution of desired purity. More often, such processes are focused on the recovery of battery scrap material. There is a need for processes which allow raw materials of various quality grades and nickel contents to be processed to a battery-grade, high-purity nickel sulphate solution. In addition, such novel processes should also have a high economy in terms of number of process steps and a high efficiency in terms of recovery of nickel as well as in recovery of other valuable materials such as cobalt.

In conclusion, there is need for a simple, efficient and practical method by which high-purity nickel sulphate with low levels of cobalt, manganese, magnesium and other impurities are achieved and which results in nickel sulphate that can be used in high-purity-demanding applications such as electroless deposition of nickel metal layers or as precursor for battery cathode materials. It is an object of the present invention to provide a novel process for producing a high-purity nickel sulphate solution from an aqueous nickel solution comprising cobalt, magnesium and manganese and optionally impurities such as iron, zinc, copper, cadmium and calcium. Furthermore, it is an object of the present invention that nickel sulphate can easily be produced with a stable quality. Finally, it is an object of the present invention to provide a process which allows for the production of a cobalt-rich aqueous solution suitable for further processing out of crude nickel raw materials.

SUMMARY

The current invention provides in a solution for at least one of the abovementioned problems by providing a process for preparing a high-purity nickel sulphate solution, as described in claim 1.

The present invention has the advantage that the elements cobalt, zinc, manganese, cadmium, aluminium, copper, calcium, as well as magnesium, all if present, are completely separated from nickel.

The overall process according to the invention is efficient in the sense that it provides a nickel solution of high purity, i.e. at least 99.8 at. % nickel relative to the metal content of said solution, while avoiding loss of materials thanks to minimal co-extraction of the matrix element that is nickel; this way avoiding the formation of complex nickel containing mixtures. As such, the process according to the present invention is environmentally friendly. The processing strategy is such that presence in the end solution of unwanted ions originating from used reagents during the nickel refining process in the nickel sulphate end solution, such as calcium from calcium bases, sodium from sodium bases and chlorides from hydrochloric acid, is avoided. This way the nickel sulphate solution obtained from the presented process is easily further processed by crystallization or spray drying to form nickel sulphate crystals or granules, respectively, which are easily transported. Advantageously, the present invention also allows for the production of a cobalt-rich eluate and a manganese-rich eluate, which can be further processed separately, e.g., for the production of high-purity cobalt salts as cobalt chloride, cobalt sulphate, . . . and for the production of high-purity manganese salts as manganese chloride, manganese sulphate, . . . , respectively. The inventive process is simple, environmentally friendly and provides nickel sulphate of high purity.

Moreover, the present invention provides a process wherein a raw materials feed such as battery scrap materials, mixed hydroxide precipitate (MHP), and cobalt hydroxide intermediate precipitate (CHIP) or mixtures thereof can be converted from a complex, impure feed to a battery-grade nickel sulphate solution using merely three solvent extraction steps and if applicable a precipitation step for eliminating iron, aluminium, etc. prior to the solvent extraction steps. The battery-grade nickel sulphate solution obtained by the process can be used directly for the production of battery precursor materials, i.e., without the need for further purification by ion exchange, extraction or otherwise.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows at least and do not exclude or preclude the presence of additional, non-recited components, features, elements, members or steps known in the art or disclosed therein.

The recitation of numerical ranges by endpoints includes all numbers and fractions subsumed within that range, as well as the recited endpoints. All percentages are to be understood as percentage by weight, abbreviated as "wt. %"

or as volume percent, abbreviated as "vol. %" or as atomic percent, abbreviated as "at. %", unless otherwise defined or unless a different meaning is obvious to the person skilled in the art from its use and in the context wherein it is used.

Regarding the organic phase following terms are used to identify its components or the whole:
  i. In the context of the present invention, the term "organic phase" is to be understood as synonymous for the term "solvent" or "solvent mixture" and designates a liquid composition comprising one or more extractants, diluents, and optionally one or more modifiers.
  ii. The "extractant" or extracting agent is the active component in the organic phase that extracts the metal species to the organic phase by chemically binding with it and forming a metal-extractant complex that is better soluble in the organic phase than it is in the aqueous phase.
  iii. The "diluent" is an organic molecule or usually a mixture of different organic molecules added to the organic phase to dilute the extractant and allow for dissolution of the metal complexes, improve the physical properties of the organic phase (especially phase-separation phenomena) and decrease its cost, given that diluents are usually cheaper than extractants. Diluents are frequently kerosene fractions and can be aliphatic or aromatic hydrocarbons, naphtenes, etc., or mixtures thereof. The diluent is preferably a kerosene-based petroleum fraction such as Escaid, Elixore, Shellsol, Isopar, etc.
  iv. The organic phase may also contain a "modifier". A modifier is sometimes added to improve solubility of metal complexes into the organic phase, to alter the physical properties of the solvent such to avoid crud formations or third-phase formation as these phenomena are unwanted in solvent extraction. A modifier can also be added to prevent chemical degradation of extractant or diluent. However, modifiers may impair the selectivity of the organic phase as these may participate in the complex formation of the metals with the extractant.

The "selectivity" S of an extractant for one metal over another metal can be expressed as the ratio of the distribution coefficients D for both metals:

$$S_{Mg/Ni} = D_{Mg}/D_{Ni}$$

The "distribution coefficient" of a metal is understood to be the ratio of the equilibrium concentrations of this metal in the organic phase and the same metal in the aqueous phase, respectively:

$$D_M = [M]_O/[M]_A$$

wherein M is a metal, such as nickel or magnesium, O refers to the organic phase and A refers to the aqueous phase.

In the context of the present invention, the term "raw material feed" refers to one or more feedstocks that comprise any one or a combination of nickel, cobalt, manganese, or lithium. Said metals may be included as such or may be included as a compound of the aforementioned metals, or as a mixture of compounds. In some embodiments, said raw material feed may comprise any one or combination of raw materials and recycled materials. Examples of raw materials include, but are not limited to, mixed hydroxide precipitates (MHP), mixed sulphide precipitates (MSP), nickel sulphide concentrate, cobalt sulphide concentrate, nickel laterite, nickel matte, or ferronickel. Examples of recycled materials include, but are not limited to, spent cathode material, and material derived from recycled lithium-ion batteries or lithium-ion battery manufacturing scrap, collectively, referred to herein as 'black mass'.

In the context of the present invention, the term "MHP" is to be considered as an abbreviation of the term "mixed hydroxide precipitate." Mixed hydroxide precipitate (MHP) is an intermediate product of nickel metallurgy derived from processing laterite ores which contains primarily nickel and a minor amount of cobalt. MHP is a solid product which is typically prepared by extracting nickel and cobalt from laterite ores. Alternatively, or additionally, MHP may be obtained from nickel and/or cobalt containing materials produced as production waste during preparation of cathode materials or obtained from battery recycling processes.

In the context of the present invention, the term "CHIP" is to be considered as an abbreviation of the term "cobalt hydroxide intermediate precipitate." Cobalt hydroxide intermediate is comprised primarily of cobalt, and typically has a cobalt content of 25 wt. % to 40 wt. %, relative to the total weight of said intermediate product. Typically, said CHIP comprises a significant amount of nickel. CHIP's are known to have a very low amount of impurities, which render them attractive for processes according to the present invention.

Said "raw material feed" may refer to a solid feed comprising an MHP product, a CHIP product, or a mixture of two or more MHP products, two or more CHIP products, or a mixture of one or more MHP products and one or more CHIP products. Preferably, said raw material feed comprises at least one nickel compound and at least one cobalt compound. Preferably, said nickel compound and said cobalt compound are comprised as a nickel (II) compound and as a cobalt (II) compound, respectively. Yet, said nickel compound and said cobalt compound may also be comprised in higher oxidation states such as 3+ or 4+, or said metal-containing feed may comprise a mixture of nickel and/or cobalt compounds in oxidation state 2+ and in oxidation state 3+ and/or 4+. In addition, said raw material feed may comprise alloys of nickel (0) and cobalt (0), and/or said raw material feed may comprise one or more ores comprising nickel and cobalt.

In the context of the present invention, the term "continuous process" is to be considered as a process in which the produced solution has a substantially constant outflow and composition. Specifically, a continuous process is a process in which the produced solution has a constant composition within the range of what are considered normal process variations. More specifically, the produced solution has a composition wherein the concentration of each ingredient is within the range of +/−20% or less, preferably +/−10% or less, more preferably +/−5% or less, even more preferably +/−3% or less of its average concentration. In a preferred embodiment, the present invention provides a continuous process which operates under steady-state conditions.

In the context of the present invention, the term "aqueous medium" is used for a water-based solution. The aqueous medium facilitates the handling of the contents of the reactor, such as mixing or pumping. The aqueous medium may already contain some of the other ingredients taking part in the reaction, or those can be added later. Said aqueous medium may in particular contain the mineral acid.

In the context of the present invention, the term "cathode precursor material" is comprised of a mixed metal hydroxide, carbonate, oxyhydroxide and/or oxide, and comprises nickel and at least one metal selected from cobalt, manganese and aluminium. Preferably, said cathode precursor material comprises Ni in an amount of at least 30 mol. %, or even at least 50 mol. %, relative to the total content of nickel, cobalt, manganese and aluminium in said cathode precursor material, preferably in an amount of 60 mol. % to 95 mol. %, and all values there in between. Said cathode precursor material may further comprise one or more metals selected from Ba, Al, Ti, Zr, W, Fe, Cr, Mo, Nb, Mg and V, more preferably from Al, Ti, Zr, W and Mg. In one preferred embodiment, said cathode precursor material comprises Ni, Co and Al.

In another preferred embodiment, said cathode precursor material comprises Ni, Co and Mn.

In a first aspect, the present invention provides a process for preparing a high-purity nickel sulphate solution, comprising the steps of:
  i. forming an aqueous mixed metal sulphate solution by reacting sulphuric acid with a raw material feed comprising nickel, manganese, cobalt and magnesium in an aqueous medium;
  ii. extracting manganese from said aqueous mixed metal sulphate solution using a first organic phase comprising a first alkylphosphorus-based extractant (I) and a first diluent, thereby obtaining a first aqueous raffinate comprising nickel, cobalt and a magnesium content and a manganese-rich organic phase;
  iii. extracting cobalt from said first aqueous raffinate using a second organic phase comprising a second alkylphosphorus-based extractant (II) and a second diluent, thereby obtaining a second aqueous raffinate comprising nickel and a residual magnesium content and a cobalt-rich organic phase; and
  iv. extracting magnesium from said aqueous raffinate solution using a third organic phase comprising a third alkylphosphorus-based extractant (III) and a third diluent, thereby obtaining a high-purity nickel sulphate solution and a magnesium-enriched organic phase.

In a preferred embodiment, the present invention provides a process according to the first aspect of the invention, wherein:
  a) said first alkylphosphorus-based extractant (I) comprises an alkylphosphoric acid, and/or nickel and/or cobalt salts thereof,
  b) said second alkylphosphorus-based extractant (II) comprises an alkylphosphinic acid and/or nickel salts thereof, and
  c) said third alkylphosphorus-based extractant (III) comprises an alkylphosphinic acid and/or nickel salts thereof.

In a preferred embodiment, the present invention provides a process according to the first aspect of the invention, wherein said extraction in step ii. is performed at a temperature between 2° and 45° C., preferably at a temperature between 2° and 40° C., more preferably at a temperature between 25 and 35° C., most preferably at a temperature of about 20° C., 25° C., 30° C., 35° C., or 40° C., or any value there in between. It was found that lower temperatures provide a better selectivity for Mn extraction, and thus better separation of Mn from Co. Preferably, said temperature is above 20° C., or even above 25° C. to facilitate operational temperature settings under circumstances of high environmental temperature.

In a preferred embodiment, the present invention provides a process according to the first aspect of the invention, wherein said extraction in step iii. is performed at a temperature between 4° and 60° C., preferably at a temperature of about 50° C. It was found that a sufficiently low temperature in step ii. in combination with a higher temperature in step iii. contributes to the separation of manganese and cobalt from the aqueous stream, which is obtained as an aqueous raffinate in step iii. Advantageously, the set-up of the present inventive process allows for a battery-grade, high-purity nickel sulphate solution to be obtained in three solvent extraction steps, avoiding the need for extracting Ni from the aqueous stream. Hence, the present invention also provides a process according to the first aspect of the invention, wherein said high-purity nickel sulphate solution obtained in step iv. is not subjected to a solvent extraction for extracting nickel from the aqueous nickel sulphate solution.

The solvent extraction steps ii., iii. and iv. can be performed in any device suitable and are not specifically limited. Solvent extraction equipment generally includes at least one or more devices consisting of a mixer-settler, a column contactor, a centrifugal contactor or any other type of contactor. Preferably, the extraction is performed in a counter-current configuration.

Said first aqueous raffinate obtained in step ii. comprises (i) nickel sulphate, (ii) cobalt sulphate, and (iii) magnesium in a concentration between 20 mg/L and 20 g/L, and preferably magnesium in a concentration between 20 mg/L and 2 g/L, and more preferably magnesium in a concentration between 20 mg/L and 500 mg/L. Generally, the residual impurity content in the obtained first aqueous raffinate (A1) is too high for high-purity applications and is therefore subjected to a second solvent extraction step.

Said second aqueous raffinate obtained in step iii. comprises (i) nickel sulphate, (ii) and (ii) magnesium in a concentration between 20 mg/L and 20 g/L, and preferably between 20 mg/L and 2 g/L, and more preferably between 20 mg/L and 500 mg/L.

Generally, the residual magnesium content in the obtained second aqueous raffinate (A2) is too high for high-purity applications and is therefore subjected to a third solvent extraction step to extract magnesium.

In a preferred embodiment, the present invention provides a process according to the first aspect of the invention, wherein said aqueous mixed metal sulphate solution comprises at least nickel, manganese, cobalt and magnesium, and further comprises one or more impurities selected from the group comprising zinc, calcium, cadmium, iron, aluminium, and copper. Other impurities may be present as well. The present invention has the advantage that the elements cobalt, magnesium, and manganese, and if present zinc, calcium, cadmium, iron, aluminium, and copper, are completely separated from nickel in one straightforward sequence of solvent extraction processes. It affords a high-purity aqueous nickel sulphate solution comprising nickel with a concentration between 40 and 200 g/L and magnesium with a concentration of at most 10 mg/L, and three loaded organic phases, i.e. a manganese-rich organic phase comprising manganese, magnesium, cobalt and nickel, and if present zinc, copper, cadmium and calcium; a cobalt-rich organic phase comprising nickel and a part of the residual content of magnesium; and, a magnesium-enriched organic phase comprising nickel and magnesium. Preferably, said high-purity aqueous nickel sulphate solution comprises at most 5 mg/L magnesium, and even more preferably at most 1 mg/L. Said first, second and/or third organic phase may comprise a modifier.

In a preferred embodiment, the present invention provides a process according to the first aspect of the invention, wherein said aqueous mixed metal sulphate solution entering step ii. has a pH between 1.0 and 4.0 before being contacted with said solvents comprising extractant I, generating a chemical equilibrium between the aqueous nickel solution and the solvent, more preferably at a pH between 1.5 and 3.5, and most preferably at a pH between 2.0 and 3.0.

In a preferred embodiment, the present invention provides a process according to the first aspect of the invention, wherein said first aqueous raffinate entering step iii. has a pH between 2.5 and 5.5 before being contacted with said solvents comprising extractant II, generating a chemical equilibrium between the aqueous nickel solution and the solvent, more preferably at a pH between 3.0 and 5.0, and most preferably at a pH between 3.5 and 4.5.

In a preferred embodiment, the present invention provides a process according to the first aspect of the invention, wherein said second aqueous raffinate entering step iv. has a pH between 4.0 and 6.5 before being contacted with said solvents comprising extractant III, generating a chemical equilibrium between the aqueous nickel solution and the solvent, more preferably at a pH between 4.5 and 6.0, and most preferably at a pH between 5.0 and 5.5.

In a preferred embodiment, the present invention provides a process according to the first aspect of the invention, wherein said extraction in step iv. is performed at a temperature between 45 and 65° C., preferably at a temperature of about 55° C.

In a preferred embodiment, the present invention provides a process according to the first aspect of the invention, further comprising the step of removing, at least in part, lithium from said aqueous mixed metal sulphate solution prior to step ii. Said lithium may be removed prior to step ii. by washing from said raw material prior to step i. Alternatively, lithium may be removed from the obtained high-purity nickel sulphate solution after step iv. Thus, in an alternative or complementary embodiment, said process further comprises the step of removing, at least in part, lithium from said aqueous mixed metal sulphate solution after step iv.

In a preferred embodiment, the present invention provides a process according to the first aspect of the invention, wherein nickel is scrubbed from said manganese-rich organic phase, from said cobalt-rich organic phase and/or from said magnesium-enriched organic phase.

In a preferred embodiment, the present invention provides a process according to the first aspect of the invention, wherein said magnesium-depleted, high-purity aqueous nickel sulphate solution comprises nickel in a concentration of 40 to 180 g/L, and magnesium in a concentration of at most 5 mg/L.

In a preferred embodiment, the present invention provides a process according to the first aspect of the invention, wherein said aqueous mixed metal sulphate solution formed in step i. comprises nickel and cobalt in an amount of at least 30 at. %, preferably at least 50 at. %, more preferably at least 70 at. %, and most preferably at least 85 at. %, relative to the total metal content of said aqueous mixed metal sulphate solution. Preferably, the present invention provides a process according to the first aspect of the invention, wherein said aqueous mixed metal sulphate solution formed in step i. comprises nickel and cobalt in an amount of at least 30 at. %, preferably at least 60 at. %, relative to the total metal content of said aqueous mixed metal sulphate solution, and wherein said aqueous mixed metal sulphate solution formed in step i. comprises magnesium, manganese, zinc, copper and cadmium in an amount of at most 40 at. %, relative to the total metal content of said aqueous mixed metal sulphate solution. Preferably, said aqueous mixed metal sulphate solution comprises nickel and cobalt in an amount of at least 75 at. %, more preferably, said aqueous mixed metal sulphate solution comprises nickel and cobalt in an amount of at least 90 at. %, and most preferably said aqueous mixed metal sulphate solution comprises nickel and cobalt in an amount of at least 95 at. %. In a preferred embodiment, the present invention provides a process according to the first aspect of the invention, wherein said aqueous mixed metal sulphate solution formed in step i. further comprises calcium, zinc, copper and cadmium in a totalized amount of at most 25 at. %, relative to the total metal content of said aqueous mixed metal sulphate solution. Preferably, said aqueous mixed metal sulphate solution further comprises calcium, zinc, copper and cadmium in a totalized amount of at most 10 at. % and even more preferably in an amount of at most 5 at. %. Hereby, the aqueous mixed metal sulphate solution can originate from all kinds of resources like mixed hydroxide precipitates, crude nickel sulphate or any other type of suitable resource which is suitable as such or which has optionally been processed into a suitable feed solution. This processing can include leaching, selective leaching, dissolving, precipitation steps and/or any other type of pre-treatment step. Combinations hereof are possible. For example, a pre-processed battery recycling material containing nickel, cobalt, manganese and lithium can be treated in this flowsheet to produce a pure nickel sulphate solution and a pure cobalt salt solution if at least leaching and eventually upfront lithium removal is included in the pre-processing. Alternatively, lithium is removed at the end of step vi. by means of for example lithium ion-exchange columns.

In a preferred embodiment, the present invention provides a process according to the first aspect of the invention, wherein said first, second and third organic phase provided in steps ii., iii. and iv. comprise said first, second and third extractant, respectively, in an amount of 5 to 50 vol. %, relative to the total volume of said solvents, and said diluents in an amount of 50 to 95 vol. %, relative to the total volume of said solvents.

In a preferred embodiment, the present invention provides a process according to the first aspect of the invention, wherein said first organic phase used in step ii. comprises said first extractant (I) in an amount of 5 to 50 vol. %, relative to the total volume of said first organic phase, and said first diluent in an amount of 50 to 95 vol. %, relative to the total volume of said first organic phase. More preferably, said first organic phase comprises said first extractant (I) in an amount of 30 to 40 vol. %, and said first diluent in an amount of 60 to 70 vol. %.

In a preferred embodiment, the present invention provides a process according to the first aspect of the invention, wherein said second organic phase used in step iii. comprises said second extractant (II) in an amount of 5 to 50 vol. %, relative to the total volume of said second organic phase, and said second diluent in an amount of 50 to 95 vol. %, relative to the total volume of said second organic phase. More preferably, said second organic phase comprises said second extractant (II) in an amount of 10 to 25 vol. %, and said diluent in an amount of 75 to 90 vol. %. It was found that the extractant concentration in the organic phase allowed for an optimal extraction of cobalt without loss of processability of the solvent.

In a preferred embodiment, the present invention provides a process according to the first aspect of the invention, wherein said third organic phase used in step iv. comprises said third extractant (III) in an amount of 5 to 50 vol. %, relative to the total volume of said third organic phase, and said third diluent in an amount of 50 to 95 vol. %, relative to the total volume of said third organic phase. More preferably, said third organic phase comprises said third extractant (III) in an amount of 10 to 25 vol. %, and said diluent in an amount of 75 to 90 vol. %. It was found that the extractant concentration in the organic phase allowed for an optimal extraction of magnesium without loss of processability of the solvent.

In a preferred embodiment, the present invention provides a process according to the first aspect of the invention, wherein said first, second and/or third diluent is a hydrocarbon. More generally, any organic, water-immiscible solvent capable of dissolving the extractant can be used. Hence, the diluent is not specifically limited. As diluent examples, kerosene-based compounds, which can be aliphatic, naphthenic, aromatic or even mixtures thereof, can be used.

In a preferred embodiment, the present invention provides a process according to the first aspect of the invention, wherein said first extractant is preloaded with nickel and/or cobalt, preferably with nickel, i.e., converted to their nickel and/or cobalt salts, preferably to their nickel salt, to a concentration of at least 20% of the available extractant capacity. Preferably, said second and third extractant are preloaded with nickel, i.e., converted to their nickel salt, to a concentration of at least 20% of the available extractant capacity. Preferably, said first, second and third organic phase comprise less than 2 g/L sodium after preloading.

In a preferred embodiment, the present invention provides a process according to the first aspect of the invention, wherein said extractant used in step ii. comprises alkylphosphorus-based acids and/or nickel and/or cobalt salts thereof, preferably nickel salts thereof. Preferably, said extractant used in step iii. and step iv., respectively, comprise alkylphosphorus-based acids and/or nickel salts thereof. Suitable alkylphosphorus-based acids include bis(2-ethylhexyl) phosphoric acid (D2EHPA), (2-ethylhexyl) phosphonic acid mono(2-ethylhexyl) ester (EHEHPA, PC88A), bis-(2,4,4-trimethylpentyl) phosphinic acid (CYANEX272 or IONQUEST 290) and diisooctylphosphinic acid (DOPA). Alkylphosphorus-based acids act as chelating extractants due to the presence of coordinative phosphorus and oxygen atoms in these molecules. Among the elements in the aqueous solution, an element that forms the corresponding chelate compound with a higher stability facilitates the extraction efficiency more compared to an element that is less likely to form the chelate compound. Alkylphosphorus-based extractants may be chosen from, but are not limited to, the following options:

phosphoric acids, such as di-(2-ethylhexyl) phosphoric acid (also known as D2EHPA, DEHPA, HDEHP, P204), an organophosphorus compound with the formula $(C_8H_{17}O)_2PO_2H$.

phosphonic acids, such as 2-ethylhexylphosphonic acid mono-2-ethylhexyl ester (also known as EHEHPA, HEHEHP, P507, PC88A), an organophosphorus compound with the formula $R1=(C_8H_{17})\ (C_8H_{17}O)PO_2H$.

phosphinic acids, such as bis-(2,4,4-trimethylpentyl) phosphinic acid (also known as Cyanex 272, Ionquest 290), an organophosphorus compound with the formula $(C_{16}H_{34})PO_2H$.

In a preferred embodiment, the present invention provides a process according to the first aspect of the invention, wherein said first extractant (I) has a higher selectivity for calcium over nickel than said second extractant (II). In other words, said first extractant (I) has an affinity for calcium higher compared to nickel than the affinity of said second extractant (II) has for calcium over nickel. Moreover, said first extractant (I) has a higher selectivity for calcium than for nickel. Most preferably, the first extractant (I) comprises an alkylphosphoric acid such as D2EHPA. Preferably, said first alkylphosphorus-based extractant (I) comprises an alkylphosphoric acid and/or nickel and/or cobalt salts thereof, and said second alkylphosphorus-based extractant (II) comprises an alkylphosphonic acid and/or nickel salts thereof.

In a preferred embodiment, the present invention provides a process according to the first aspect of the invention, wherein said third extractant (III) has a higher selectivity for magnesium than said first (I) and second extractant (II). In other words, said third extractant (III) has an affinity for magnesium higher than the affinity of said first (I) and second extractant (II). Moreover, said third extractant (III) has a higher selectivity for magnesium than for nickel. Most preferably, the third extractant (III) comprises an alkylphosphinic acid such as IONQUEST 290.

In a preferred embodiment, said extractants used in steps ii., iii. and iv. are neutralized with an alkali metal hydroxide and preloaded with nickel at a high pH, prior to use for extraction in steps ii. to iv., where the nickel-preloaded organic phase is brought into contact with the aqueous nickel sulphate solution containing metal impurities. In such case, an exchange reaction occurs by which elements that are more likely to be extracted than nickel are transferred to the solvent, whereas nickel in the organic phase is transferred to the aqueous phase. As a result, impurities are removed from the aqueous mixed metal sulphate solution while increasing the nickel concentration in the resulting raffinate solution, hence largely avoiding introduction of the alkali metal from the neutralizing agent to the main process (raffinate) stream. As alkali metal hydroxide can be used sodium hydroxide, potassium hydroxide, ammonium hydroxide or the like. Yet, preferably, sodium hydroxide is used as an alkali metal hydroxide. Alternatively, said extractant used in step ii. can be preloaded with cobalt or a mixture of nickel and cobalt.

It was found that preloading of said extractants used in steps ii. to iv. with nickel allowed for an optimal and improved extraction without loss of processability of the extractant. During this preloading step, the partially neutralized extractant, i.e. being in the alkali-metal-converted form, exchanges the alkali metal, typically sodium, on the extractant for nickel or cobalt from an aqueous nickel sulphate solution. Preferably, the residual amount of alkali metal on the preloaded solvent is as low as possible, so to limit transfer of residual alkali metal from the preloaded solvent to the aqueous mixed metal sulphate solution when extracting impurities from this solution.

Part of nickel may be replaced by another harmless metal that will exchange with the impurities to be extracted from the aqueous nickel sulphate solution to be purified. This could be an alkali metal such as sodium or potassium, a similar species like ammonium. However, these other metals may impart the extraction of such metals present in the aqueous nickel sulphate solution to be purified, or even contaminate the nickel sulphate solution by exchanging with impurities to be extracted.

In a preferred embodiment, the present invention provides a process according to the first aspect of the invention, wherein, prior to extraction, said extractants are converted to their nickel and/or cobalt salts, preferably to their nickel salts corresponding to an appropriate conversion of the extractant, hence comprising nickel in an amount between 20 and 70% of the available extractant capacity and residual sodium accounting to a concentration of 2 g/L at most, preferably at most 0.5 g/L, and more preferably at most 0.1 g/L. Preferably, nickel is preloaded to an amount between 25 and 60% of the available extractant capacity, and preferably more than 30% of the available extractant capacity, and residual sodium accounting to a concentration of 0.5 g/L at most. More preferably, nickel is preloaded to an amount between 30 and 50% of the available extractant capacity and residual sodium accounting to a concentration of 0.1 g/L at most. For step ii. also cobalt salts or combined nickel-cobalt salts are possible with the same specifications as for nickel described above.

The preferred nickel concentration on the preloaded solvent thus depends on the extractant concentration and the conversion degree. Both are determined by the target pH in the aqueous mixed metal sulphate solution, and so, are function of the total amount of impurities to be removed. A higher conversion degree of the extractant results in a higher pH during extraction, allowing for a higher extraction of impurities (and nickel) from the nickel-containing feed solution, whereas a lower conversion degree of the extractant results in a lower pH during extraction, allowing for a better selectivity for the impurities towards nickel.

In a preferred embodiment, the preloaded solvent containing nickel and possibly some other metals such as sodium, potassium or other ones, or other cations such as ammonium, may be contacted again with a pure nickel-containing solution, such as a nickel sulphate or a nickel chloride solution, in order to further exchange the metals sodium, potassium, ammonium or other ones on the solvent with nickel from the pure nickel-containing solution. The nickel-preloading, cobalt-preloading or nickel-cobalt-preloading operation can be performed in two or more stages, preferably in counter-current operation, with at least a pure nickel sulphate solution, so to scrub possibly co-extracted alkali metals from the used base off from the solvent. As a result, a nickel-preloaded solvent containing significantly fewer other metals is obtained that can be used in extraction steps ii. to iv., this way maximally avoiding contamination of the aqueous nickel solution with unwanted metals.

In a preferred embodiment, the present invention provides a process according to the first aspect of the invention, comprising step v., step v. comprising stripping said manganese-rich organic phase obtained in step ii. with an aqueous solution comprising a mineral acid. This effectively results in the elution of manganese, calcium, and if present zinc, copper, and cadmium from said first solvent. Preferably, said mineral acid is one or more selected from the group comprising: hydrofluoric acid, hydrochloric acid, hydrobromic acid, hydroiodic acid, nitric acid, phosphoric acid, sulphuric acid, boric acid and perchloric acid. More preferably, said mineral acid is one or more selected from the group comprising: hydrochloric acid, hydrobromic acid, nitric acid, phosphoric acid and perchloric acid. In another embodiment, said mineral acid is sulphuric acid. Given the presence of calcium in the obtained stripping solution, the use of hydrochloric acid is most preferred. This allows to obtain a concentrated eluate solution comprising manganese and calcium and if present zinc, copper, cadmium and residual amounts of nickel with residual amounts of cobalt from said first solvent. As such, the extractant is regenerated to yield a metal-free solvent that can be reused for extraction or preloading. Given the presence of calcium in the obtained stripping solution, the use of hydrochloric acid is preferred. By stripping with hydrochloric acid, calcium chloride is formed which is readily water soluble. This way, the metal content can be concentrated from solvent to aqueous solution. Given the low solubility of calcium sulphate, the use of sulphuric acid could induce the formation of a solid precipitate disrupting the solvent extraction processing. In a preferred embodiment, said hydrochloric acid solution has a concentration of at least 50 g/L, and more preferably a concentration between 100 g/L and 300 g/L.

In a preferred embodiment, the present invention provides a process according to the first aspect of the invention, comprising step vi., step vi. comprising stripping said cobalt-rich organic phase obtained in step iii. with an aqueous solution comprising a mineral acid. This effectively results in the elution of cobalt from said second solvent. Preferably, said mineral acid is one or more selected from the group comprising: hydrofluoric acid, hydrochloric acid, hydrobromic acid, hydroiodic acid, nitric acid, phosphoric acid, sulphuric acid, boric acid and perchloric acid. More preferably, said mineral acid is one or more selected from the group comprising: hydrochloric acid, hydrobromic acid, nitric acid, sulphuric acid, phosphoric acid and perchloric acid. Most preferably, said mineral acid is sulphuric acid or hydrochloric acid. This allows to obtain a concentrated eluate solution comprising cobalt.

In a preferred embodiment, the present invention provides a process according to the first aspect of the invention, comprising the step of stripping said magnesium-enriched organic phase obtained in step iv. with an aqueous solution comprising a mineral acid. Preferably, said mineral acid is one or more selected from the group comprising: hydrofluoric acid, hydrochloric acid, hydrobromic acid, hydroiodic acid, nitric acid, phosphoric acid, sulphuric acid, boric acid and perchloric acid. More preferably, said mineral acid is one or more selected from the group comprising: hydrochloric acid, hydrobromic acid, nitric acid, sulphuric acid, phosphoric acid and perchloric acid. Most preferably, said mineral acid is sulphuric acid. This allows to obtain a concentrated eluate solution comprising magnesium and to regenerate the solvent.

The stripping step can be performed in any device suitable and is not specifically limited. Stripping equipment generally includes at least one or more devices consisting of a mixer-settler, a column contactor, a centrifugal contactor or any other type of contactor. Preferably, the stripping is performed in a counter-current configuration.

In a preferred embodiment, the present invention provides a process according to the first aspect of the invention, wherein said stripping steps v. and/or vi. are performed at a temperature between 40° C. and 60° C., preferably between 40° C. and 50° C., and more preferably at a temperature of about 45° C.

In a preferred embodiment, the present invention provides a post-treatment step according to the first aspect of the invention, wherein said manganese-rich organic phase, after stripping with hydrochloric acid in step v., is additionally washed with sulphuric acid. Washing with sulphuric acid allows for the removal of chloride ions and possibly residual metals, such as iron or aluminium, from the solvent. As such, the solvent is regenerated and can be reused for extraction after it is preloaded.

In a preferred embodiment, the present invention provides a post-treatment step according to the first aspect of the invention, wherein said high-purity aqueous nickel sulphate solution obtained in step iv. comprises nickel in a concentration of 40 to 180 g/L, and magnesium in a concentration of at most 5 mg/L, preferably at most 1 mg/L. Preferably, said high-purity aqueous nickel sulphate solution has the content of calcium, iron, aluminium, zinc, copper, manganese, cobalt, magnesium and/or cadmium, each individually in an amount of at most 10 mg/L, preferably in an amount of at most 5 mg/L, or even at most 1 mg/L.

In a preferred embodiment, the present invention provides a process according to the first aspect of the invention, wherein at least a part of said high-purity nickel sulphate solution obtained in step iv. is without further purification subjected to crystallization, and wherein the formed nickel sulphate crystals are used for preparing a cathode precursor material for lithium-ion batteries.

In a preferred embodiment, the present invention provides a process according to the first aspect of the invention, wherein at least a part of said high-purity nickel sulphate solution obtained in step iv. is used without further purification for preparing a cathode precursor material for lithium-ion batteries.

The present invention is particularly suited for processing of a raw materials feed comprising nickel and cobalt compounds, such as but not limited to MHP, CHIP, etc. Advantageously, no further extraction is required on the high-purity nickel sulphate solution obtained in step iv.

In a preferred embodiment, the present invention provides a process according to the first aspect of the invention, wherein at least part of said high-purity nickel sulphate solution obtained in step iv. is subjected to crystallization, wherein at least part of the mother liquor formed during crystallization is bled, and wherein at least part of the crystallizer bleed is used for preloading of one or more the organic phases used in steps ii., iii., and iv. The crystallizer bleed typically has a relatively high amount of sodium. Recycling crystallizer bleed to any of the solvent extraction steps ii., iii., and/or iv. allows to recover nickel sulphate present in the crystallizer bleed while allowing for the sodium present in said bleed to be bled out of the flowsheet via the raffinate of the preloading step.

In a preferred embodiment, the present invention provides a process according to the first aspect of the invention, wherein said high-purity aqueous nickel sulphate solution obtained after removal of residual magnesium in step iv. is subjected to crystallization or granulation. Preferably, nickel sulphate in said nickel sulphate solution is crystallized, thereby allowing for an additional purification step. In case of granulation, any granulation technique known to the skilled person is suitable, such as e.g., spray drying. In a preferred embodiment, the present invention provides a process according to the first aspect of the invention, wherein at least part of the mother liquor formed from the crystallizing unit is recycled upstream. Preferably, said crystallizer bleed comprising a saturated nickel sulphate solution is used for preloading nickel one or more extractants, specifically for preloading nickel onto one or more extractants used in one or more of steps ii., iii. and/or iv.

In a preferred embodiment, the present invention provides a process according to the first aspect of the invention, wherein nickel is scrubbed from said manganese-rich organic phase, from said cobalt-rich organic phase and/or from said magnesium-enriched organic phase. To recover this co-extracted nickel from the loaded organic phases before going to the elution section, it is first scrubbed selectively from these solvents by washing with an acidic solution, such as a sulphuric acid solution in water. Nickel is selectively scrubbed by applying optimal conditions of pH, specifically the acidity of the final scrub solution, and the added amount of acid is adapted to reach this required pH.

In a preferred embodiment, the present invention provides a process according to the first aspect of the invention, wherein said first, second and/or third organic phases, after washing or stripping with sulphuric acid, are loaded with nickel using an alkali hydroxide and a nickel and/or cobalt salt containing solution such as a nickel and/or cobalt sulphate solution or a nickel and/or cobalt chloride solution, and subsequently recycled in step ii., step iii. and/or step iv., thereby closing the loop of the process.

In a preferred embodiment, the present invention provides a process according to the first aspect of the invention, wherein said aqueous mixed metal sulphate solution is obtained by removing iron and/or aluminium from an aqueous mixed metal sulphate solution comprising nickel, cobalt, manganese, magnesium, and if present zinc, copper, cadmium and/or calcium, and further comprising iron and/or aluminium, respectively. Said iron and/or aluminium can advantageously be removed by adding a basic reagent such as a hydroxide or other to said aqueous solution, thereby forming an iron and/or aluminium hydroxide precipitate. Potentially, addition of an oxidant, like for example oxygen or hydrogen peroxide, might be included in that iron and/or aluminium removal step.

In a preferred embodiment, said iron and/or aluminium is removed by precipitation using a calcium base such as calcium hydroxide, calcium oxide, calcium carbonate, calcium bicarbonate or any other calcium-containing basic reagent. The use of a calcium base is advantageous since calcium forms calcium sulphate, also called gypsum, with low aqueous solubility in this step of the process. Hence, the use of excessive amounts of calcium base is not detrimental to the purity of the obtained nickel sulphate solution. Only a limited amount of calcium will remain into the nickel solution that is sent to the solvent extraction step ii. The latter process is designed such to enable complete removal of calcium from the nickel solution. The formation of calcium sulphate during precipitation of iron and/or aluminium enhances the filterability of the iron and/or aluminium precipitate. Hence, it may be preferred that the calcium base is used in a stoichiometric excess relative to the amount of iron and/or aluminium impurities present in said aqueous mixed metal sulphate solution comprising nickel, cobalt, magnesium and iron and/or aluminium.

In another preferred embodiment, the employed base may be a hydroxide or carbonate of nickel or any other nickel-containing basic reagent, thereby introducing beneficial nickel ions in the nickel sulphate solution. Other preferred nickel bases are nickel bicarbonate and nickel hydroxy sulphate.

In another preferred embodiment, the employed base may be a hydroxide or carbonate of cobalt or any other cobalt-containing basic reagent, thereby introducing cobalt ions in the nickel sulphate solution that will be removed in step iii. Other preferred cobalt bases are cobalt bicarbonate and cobalt hydroxysulphate.

In yet another preferred embodiment, the employed base may be a hydroxide or carbonate of magnesium or any other magnesium-containing basic reagent, since magnesium is efficiently and effectively removed in the subsequent steps of the inventive process. Other preferred magnesium bases are magnesium bicarbonate and magnesium hydroxy sulphate.

In yet another preferred embodiment, impurities such as iron and/or aluminium may be separated by precipitation using a combination of two or more precipitation agents selected from calcium base, magnesium base, cobalt base, and nickel base.

Furthermore, impurities such as iron and/or aluminium may be removed by precipitation in two or more precipitation steps, wherein a different precipitating agent may be used in each precipitation step. In a preferred embodiment, a nickel base is used in a first precipitation step, and a calcium base is used in a subsequent precipitation step.

Alternatively, impurities such as iron and/or aluminium may be separated by other methods such as neutralization. However, the use of alkali bases, such as sodium hydroxide or potassium hydroxide, will introduce metal impurities into the aqueous mixed metal sulphate solution that are not extractable by the subsequent solvent extraction processes, and thus, might complicate a potential crystallization or granulation process at the end of the flowsheet.

In another embodiment, calcium is already present into the nickel feed solution entering the solvent extraction step ii, because it was introduced by raw materials upfront or by using a calcium containing reagent, such as a calcium base as calcium hydroxide, calcium oxide, calcium carbonate, calcium bicarbonate or another calcium containing basic reagent before entering the solvent extraction step ii.

Example

For each process step an example is given to further clarify the present invention. These examples are based on experimentally derived data and nowhere intended to limit the scope of the present invention.

Extracting Manganese from a Mixed Metal Sulphate Solution

A first organic phase composed of 25 vol % D2EHPA with Escaid 110 as a diluent is used. The extractant is 49% saponified with 400 g/L NaOH.

A feed solution with the following composition is subjected to extraction:

|  | Ni (g/L) | Mn (mg/L) | Co (mg/L) | Mg (mg/L) | Ca (mg/L) | Zn (mg/L) |
|---|---|---|---|---|---|---|
| Feed | 59 | 109 | 1000 | 497 | 617 | 1639 |
| Raffinate | 53 | <1 | 700 | 305 | <1 | <1 |

Manganese extraction is performed in batch mode, in four steps, at O/A=0.25, and at a temperature of 30° C. The raffinate composition is also reported in the above table. Manganese, calcium, and zinc are removed down to less than 1 mg/L in the raffinate.

Extracting Cobalt from a Mixed Metal Sulphate Solution

A first organic phase composed of 35 vol % Cyanex 272 with Escaid 110 as a diluent is used. The extractant is first 58% saponified with 400 g/L NaOH, and then preloaded with nickel to 12.9 g/L nickel and 120 mg/L sodium from a preloading solution composed of 110 g/L nickel and 960 mg/L sodium.

A feed solution with the following composition is subjected to extraction:

|  | Ni (g/L) | Co (g/L) | Mg (mg/L) |
|---|---|---|---|
| Feed | 82 | 27 | 130 |
| Raffinate | 107 | <0.001 | 2 |

Cobalt extraction is performed in batch mode, in four steps, at O/A=1.0, and at a temperature of 55° C. The raffinate composition is also reported in the above table. Cobalt is removed down to less than 1 mg/L in the raffinate.

Extracting Magnesium from a Mixed Metal Sulphate Solution

A first organic phase composed of 15 vol % Ionquest 290 with Escaid 110 as a diluent is used. The extractant is preloaded to 6.2 g/L nickel on the solvent from a solution containing 130 g/L nickel under injection of a 125 g/L sodium hydroxide solution.

A feed solution with the following composition is subjected to extraction:

|  | Ni (g/L) | Mg (mg/L) | Na (mg/L) |
|---|---|---|---|
| Feed | 127 | 690 | 1000 |
| Raffinate | 138 | <1 |  |

Magnesium extraction is performed in batch mode, in five steps, at O/A=0.5, and at a temperature of 55° C. The raffinate composition is also reported in the above table. Magnesium is removed down to less than 1 mg/L in the raffinate.

The invention claimed is:

1. Process for preparing a high-purity nickel sulphate solution, comprising the steps of:
   i. forming an aqueous mixed metal sulphate solution by reacting sulphuric acid with a raw material feed comprising nickel, manganese, cobalt and magnesium in an aqueous medium;
   ii. extracting manganese from said aqueous mixed metal sulphate solution at a temperature between 2° and 45° C. using a first organic phase comprising a first alkylphosphorus-based extractant (I) and a first diluent, wherein said first alkylphosphorus-based extractant (I) comprises an alkylphosphoric acid and/or nickel salts thereof, thereby obtaining a first aqueous raffinate comprising nickel, cobalt and a magnesium content, and a manganese-rich organic phase;
   iii. extracting cobalt from said first aqueous raffinate at a temperature between 45 and 65° C. using a second organic phase comprising a second alkylphosphorus-based extractant (II) and a second diluent, wherein said second alkylphosphorus-based extractant (II) comprises an alkylphosphinic acid, and/or nickel salts thereof, thereby obtaining a second aqueous raffinate comprising nickel and a residual magnesium content and a cobalt-rich organic phase; and
   iv. extracting magnesium from said second aqueous raffinate solution using a third organic phase comprising a third alkylphosphorus-based extractant (III) and a third diluent, wherein said third alkylphosphorus-based extractant (III) comprises an alkylphosphinic acid, and/or nickel thereof, thereby obtaining a high-purity nickel sulphate solution and a magnesium-enriched organic phase.

2. The process according to claim 1, wherein said raw material feed further comprises iron and/or aluminium, and wherein prior to step ii. a base is added to said aqueous mixed metal sulphate solution formed in step i., thereby forming a precipitate comprising iron and/or aluminium, respectively, and wherein said precipitate is filtered off.

3. The process according to claim 2, wherein said base comprises a calcium base, a magnesium base, a cobalt base, a nickel base, or a combination of two or more of the aforementioned bases.

4. The process according to claim 1, wherein at least part of said high-purity nickel sulphate solution obtained in step iv. is subjected to crystallization without further purification, and wherein the formed nickel sulphate crystals are used for preparing a cathode precursor material for lithium-ion batteries.

5. The process according to claim 1, wherein at least part of said high-purity nickel sulphate solution obtained in step iv. is used without further purification for directly preparing a cathode precursor material for lithium-ion batteries.

6. The process according to claim 1, comprising a step of stripping said magnesium-enriched organic phase obtained in step iv. with an aqueous solution comprising a mineral acid.

7. The process according to claim 1, wherein said extraction in step iv. is performed at a temperature between 45 and 65° C.

8. The process according to claim 1, wherein said first, second and third extractants are preloaded with nickel to a concentration of at least 20% of the available extractant capacity.

9. The process according to claim 1, wherein at least part of said high-purity nickel sulphate solution obtained in step iv. is subjected to a crystallization process, which results in a mother liquor, at least a part of which is recycled and used to preload one or more of the organic phases used in steps ii., iii., and iv.

10. The process according to claim 1, further comprising a step of removing, at least in part, lithium from said aqueous mixed metal sulphate solution prior to step ii.

11. The process according to claim 1, comprising step v., step v. comprising stripping said manganese-rich organic phase obtained in step ii. with an aqueous solution comprising a mineral acid.

12. The process according to claim 1, comprising step vi., step vi. comprising stripping said cobalt-rich organic phase obtained in step iii. with an aqueous solution comprising a mineral acid.

13. The process according to claim 1, wherein said first, second and third organic phase provided in steps ii., iii. and iv. comprise said first, second and third extractant, respectively, in an amount of 5 to 50 vol. %, relative to the total volume of said solvents, and said diluents in an amount of 50 to 95 vol. %, relative to the total volume of said solvents.

14. The process according to claim 1, wherein nickel is scrubbed from said manganese-rich organic phase, from said cobalt-rich organic phase and/or from said magnesium-enriched organic phase.

15. The process according to claim 1, wherein cobalt is scrubbed from said manganese-rich organic phase.

16. The process according to claim 1, wherein said aqueous mixed metal sulphate solution formed in step i. comprises nickel and/or cobalt in an amount of at least 60 at. %, relative to the total metal content of said aqueous mixed metal sulphate solution, and wherein said aqueous mixed metal sulphate solution formed in step i. comprises calcium, magnesium, zinc, copper, and cadmium in an amount of at most 40 at. %, relative to the total metal content of said aqueous mixed metal sulphate solution.

17. The process according to claim 11, wherein said first organic phase, after stripping with said mineral acid, is washed with sulphuric acid.

* * * * *